United States Patent
Nguyen

(10) Patent No.: US 9,602,793 B2
(45) Date of Patent: Mar. 21, 2017

(54) SKIN TONE DETECTION IN A DIGITAL CAMERA

(75) Inventor: Hugh Phu Nguyen, San Jose, CA (US)

(73) Assignee: Imagination Technologies Limited, Kings Langley (GB)

( * ) Notice: Subject to any disclaimer, the term of this patent is extended or adjusted under 35 U.S.C. 154(b) by 1058 days.

(21) Appl. No.: 12/634,078

(22) Filed: Dec. 9, 2009

(65) Prior Publication Data

US 2011/0134275 A1    Jun. 9, 2011

(51) Int. Cl.
*H04N 9/73* (2006.01)
*G06K 9/00* (2006.01)
*G06K 9/46* (2006.01)
*H04N 5/232* (2006.01)
*H04N 5/235* (2006.01)

(52) U.S. Cl.
CPC ......... *H04N 9/735* (2013.01); *G06K 9/00234* (2013.01); *G06K 9/4642* (2013.01); *H04N 5/235* (2013.01); *H04N 5/23212* (2013.01); *H04N 5/23219* (2013.01)

(58) Field of Classification Search
CPC ....................................................... H04N 9/735
USPC ....................................... 348/223.1; 382/195
See application file for complete search history.

(56) References Cited

U.S. PATENT DOCUMENTS

| | | | |
|---|---|---|---|
| 6,961,462 B2 * | 11/2005 | Watanabe et al. | 382/164 |
| 2004/0080621 A1 * | 4/2004 | Fisher et al. | 348/207.99 |
| 2007/0172119 A1 * | 7/2007 | Pan et al. | 382/162 |
| 2010/0026836 A1 * | 2/2010 | Sugimoto | 348/223.1 |
| 2010/0158363 A1 * | 6/2010 | Jiang et al. | 382/165 |

* cited by examiner

*Primary Examiner* — Usman Khan
(74) *Attorney, Agent, or Firm* — Vorys, Sater, Seymour and Pease LLP; Vincent M DeLuca

(57) ABSTRACT

Disclosed is a method for processing sensor data in an image processor that implements at least one image enhancement process, the method comprising: a) performing a skin tone detection operation to identify skin tone areas in the sensor data; b) selectively modifying at least one image enhancement process for the identified skin tone areas; and c) applying the at least one modified image enhancement process to the identified skin tone areas.

15 Claims, 4 Drawing Sheets

SKIN TONE DETECTION IN A DIGITAL CAMERA

TECHNICAL FIELD OF THE DISCLOSURE

The present disclosure generally relates to digital images, and more particularly to processing of sensor data in a digital imaging device.

BACKGROUND OF THE DISCLOSURE

A digital imaging device, such as a digital camera, may capture a variety of compositions using a push/capture button present on the digital imaging device. A composition may undergo a pre capture processing and a post capture processing in the digital imaging device. Specifically, in the pre capture processing, the composition may be displayed to a user on a display screen with the help of camera optics and an image sensor present in the digital imaging device. The composition that is displayed to the user via the image sensor is referred to as sensor data. Further, in the pre capture processing, a user may depress the push button halfway to calibrate and freeze camera settings and other image enhancement settings such as Auto focus, Auto Exposure, and Auto White Balance for the sensor data. The pre capture processing may be executed by a pre capture processing module present in the digital imaging device.

In the post capture processing, several image processing algorithms may be employed for improving image quality after the composition is captured by the digital imaging device. However, the image processing algorithms used in the post capture processing are not able to produce good quality images.

SUMMARY OF THE DISCLOSURE

In one aspect, the present disclosure provides a method for processing sensor data in an image processor that implements at least one image enhancement process, the method comprising: a) performing a skin tone detection operation to identify skin tone areas in the sensor data; b) selectively modifying at least one image enhancement process for the identified skin tone areas; and c) applying the at least one modified image enhancement process to the identified skin tone areas.

In another aspect, the present disclosure provides an image processor for processing sensor data, the image processor implements at least one image enhancement process, the image processor comprising: a) a skin tone detector capable of performing a skin tone detection operation to identify skin tone areas in the sensor data; b) a one image enhancement module capable of selectively modifying at least one image enhancement process for the identified skin tone areas; and c) a control circuitry capable of applying the at least one modified image enhancement process to the identified skin tone areas.

In yet another aspect of the present disclosure, the present disclosure provides computer-implemented methods, computer systems and a computer readable medium containing a computer program product for processing a sensor data by an image processor, the computer program product comprising: a) program code for performing a skin tone detection operation to identify skin tone areas in the sensor data; b) program code for selectively modifying at least one image enhancement process for the identified skin tone areas; and c) program code for applying the at least one modified image enhancement process to the identified skin tone areas.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
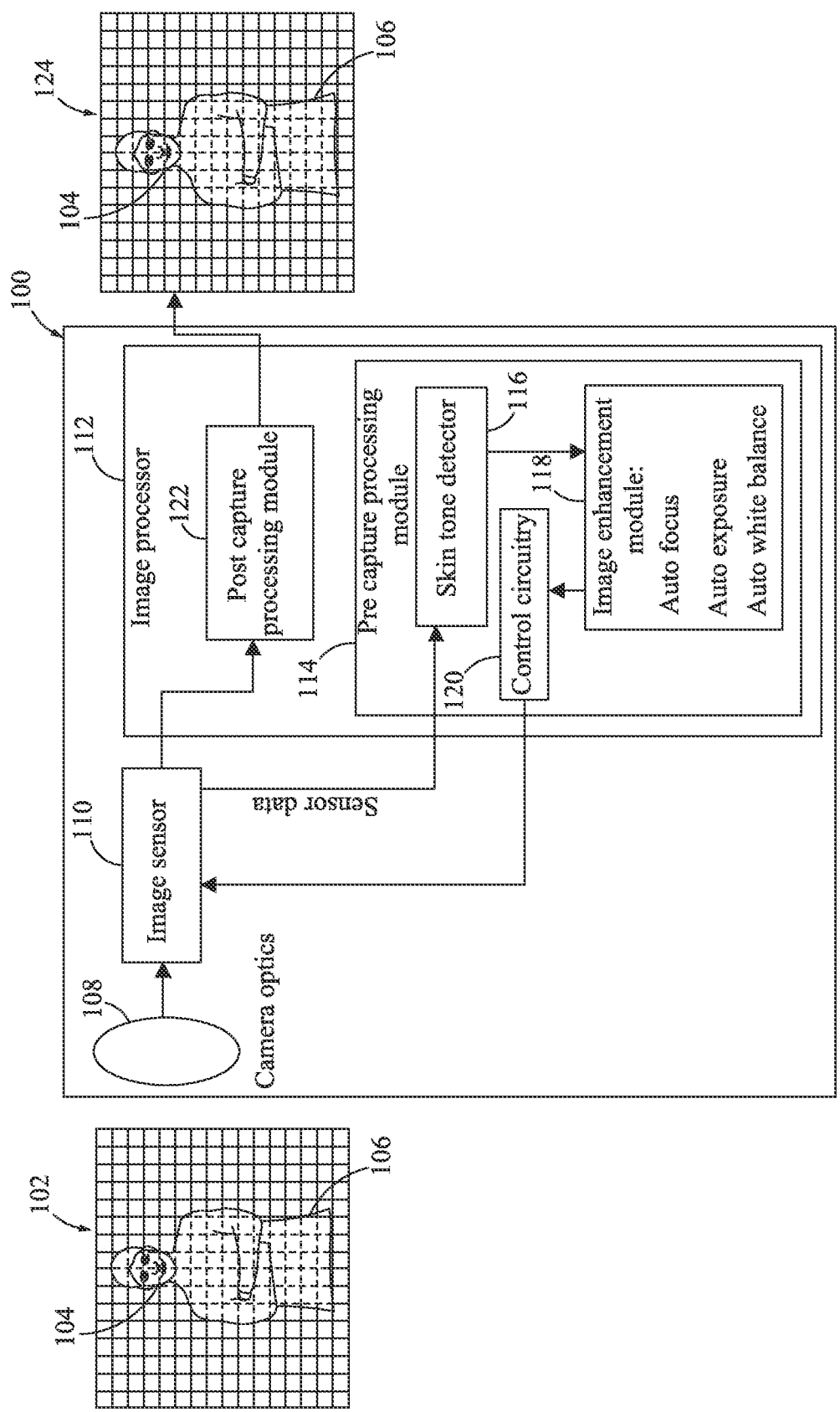
FIG. 1 shows a block diagram of a digital imaging device, in accordance with an embodiment of the invention.

The method and system have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before describing in detail embodiments that are in accordance with the present disclosure, it should be observed that the embodiments reside primarily in combinations of method steps and system components related to processing a digital image.

As used herein, relational terms such as first and second, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements that does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Any embodiment described herein is not necessarily to be construed as preferred or advantageous over other embodiments. All of the embodiments described in this detailed description are illustrative, and provided to enable persons skilled in the art to make or use the disclosure and not to limit the scope of the disclosure, which is defined by the claims.

The present disclosure provides a method and a system for detecting skin tone in sensor data in pre capture processing. Various methods of detecting a skin tone in the sensor data would be explained in the following description sections. Further, based on the skin tone detection, at least one image enhancement process is selectively modified in the pre capture processing, as will be explained in conjunction with FIGS. 1 to 4.

Referring to FIG. 1, a block diagram of a digital imaging device 100 is shown, in accordance with an embodiment of the present disclosure. In one embodiment, the digital imaging device 100 is a digital camera. The digital imaging device 100 may be used to process a sensor data 102 in pre capture processing. In one embodiment of the present disclosure, the sensor data 102 is of a human being who is to be captured. The human being would obviously display some skin area and some non skin area. Therefore, the sensor data 102 of the human being would have skin tone pixels 104 and non-skin tone pixels 106 as shown in FIG. 1. The skin tone pixels 104 are represented by a face area of the human being and the non-skin tone pixels 106 are represented by an abdomen area of the human being. In one embodiment, the sensor data 102 may comprise millions of pixels depending on the resolution of an image sensor. However, for the sake of brevity of this description, a 16×16 pixel matrix of the sensor data 102 is shown for explaining the various embodiments of the present invention.

In one embodiment of the present disclosure, the digital imaging device 100 includes camera optics 108, an image sensor 110, and an image processor 112. The camera optics 108 and the image sensor 110 may enable a user to view the sensor data 102 on a display screen (not shown). The sensor data 102 may be read by the image processor 112 for processing of the sensor data 102. Subsequent to the processing of the sensor data 102 in the image processor 112, the sensor data 102 is again fed back to the image sensor 110 so that the image sensor 110 may capture a good quality digital image. The digital image captured by the image sensor 110 may be read by the post capture processing module 122 for post processing.

In one embodiment of the present disclosure, a filter (not shown) may be employed before the image sensor 110 so as to enable the image sensor 110 to pass a good quality image to the image processor 112. Specifically, in digital imaging devices, color digitization process can cause a false detection of skin tone color in the image processor 112. For example, dark colors have high noise and low dynamic range making skin tone detection very difficult. Similarly, highlight colors do not have enough dynamic range to make the skin tone detection reliable. For this reason, the present invention may include a filter to remove these problem colors before the sensor data 102 is read by the image processor 112.

After filtering of the sensor data 102, the sensor data 102 may be read by a pre capture processing module 114 present in the image processor 112. The pre capture processing module 114 includes a skin tone detector 116, an image enhancement module 118, and a control circuitry 120. The skin tone detector 116 would differentiate the skin tone pixels 104 from the non-skin tone pixels 106 present in the sensor data 102. In other words, the skin tone detector 116 classifies the sensor data 102 as one of a skin tone data and a non skin tone data. Specifically, the skin tone detector 116 may perform a skin tone detection operation to identify skin tone areas in the sensor data 102.

In one embodiment of the present disclosure, the skin tone operation may include several steps. In a first step, the skin tone detector 116 may convert a color of the sensor data 102 to a color space such as a YUV color space. Specifically, the skin tone detector 116 may convert the color of the sensor data 102 on a pixel by pixel basis or on a block by block basis to the YUV color space. In a second step, skin tone detector 116 may extract chrominance components, such as a U component and a V component, of the color from the YUV color space. Extracting the chrominance components may entail discarding the luminance component Y from the YUV color space. In a third step, the skin tone detector 116 may determine whether the chrominance components, such as the U component and the V component, of the sensor data 102 are in a skin tone range.

The skin tone range in the YUV color space is defined by the following equations:

$$90 <= U\ component <= 125;$$

$$133 <= V\ component <= 171;\ \text{and}$$

$$270 <= V\ component + 1.1875 U\ component <= 291.$$

Specifically, the skin tone detector 116 may classify a pixel in the sensor data 102 as a skin tone pixel if the pixel's chrominance components viz. a U component and a V component satisfy each of the above equations. More specifically, when the sensor data 102 is read by the skin tone detector 116, the chrominance components of the skin tone pixels 104 of the sensor data 102 would satisfy the above equations and the chrominance components of the non-skin tone pixels 106 of the sensor data 102 would not satisfy the above equations.

It will be evident to a person skilled in the art that although the present inventions describes a usage of a YUV color space to determine a skin tone, any color space such as a YCbCr color space may be used to perform similar steps to detect skin tones. Furthermore, the skin tone range does not necessarily have to be defined by the above equations; and any range that is easy to determine and is capable of determining a skin tone would be applicable to the invention.

In one embodiment of the present disclosure, the sensor data 102 may be processed pixel by pixel basis by the image processor 112. However, in another embodiment of the present disclosure, the sensor data 102 may be divided into blocks of pixels and an average color for each pixel block of pixels may be calculated prior to processing the block of pixels by the skin tone detector 116.

In one embodiment of the present disclosure, subsequent to the skin tone detection operation, the skin tone detector 116 may divide the sensor data 102 into blocks of pixels and may further calculate a percentage of the skin tone area within each block of pixels. Specifically, the skin tone detector 116 may divide a total number of skin tone pixels to the total number of pixels in each block to get the percentage of the skin tone area. Depending upon the percentage of the skin tone area, the skin tone detector 116 may determine a weighting scheme. The weighting scheme assigns weights to the at least one image enhancement process, such as Auto Focus (AF), Auto Exposure (AE), and Auto White Balance (AWB) based on the percentage of the skin tone area within each block of pixels. The image enhancement module 118 may selectively modify the at least one image enhancement process for the identified skin tone areas based on the assigned weights.

In one embodiment of the present disclosure, the weighting scheme may assign weighs with a scale that is proportional to the percentage of the skin tone area. In this embodiment, the image enhancement module 118 may put emphasis on AF, AW, and AWB to modify at least one of them. Subsequently, the control circuitry 120 may apply the at least one modified image enhancement process such as AF to the skin tone areas to get better focus. Further, the control circuitry 120 may apply the modified AE and AWB processes on the skin tone areas of the sensor data 102 to make the skin tone areas better exposed and better balanced. Subsequently, the modified sensor data 102 may again be fed to the image sensor 110 so that the image sensor 110 may capture the sensor data 102 to result in a digital image 124. The digital image 124 may then be sent to the post capture processing module 122 for further processing.

In another embodiment, where the skin tone areas are more desirable to be slightly out of focus, the weighting scheme may assign weighs with a scale that is inversely proportional to the percentage of the skin tone area. In this embodiment, the image enhancement module 118 may de-emphasize and may modify the at least one image enhancement process such as AF, AE, and AWB algorithms. Subsequently, the control circuitry 120 may apply the modified AF to the skin tone areas of the sensor data 102 to put them slightly out of focus. Further, the control circuitry 120 may apply the modified AE and AWB algorithms on the skin tone areas of the sensor data 102 to make the skin tone areas less exposed and less balanced.

Figure 2:
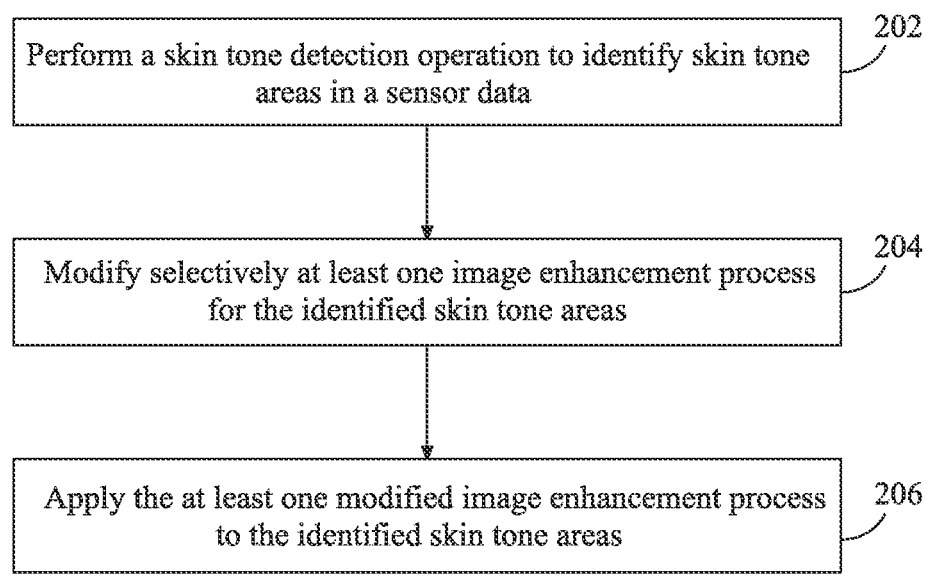
FIG. 2 is a flow chart representing a method for processing sensor data, in accordance with an embodiment of the present disclosure.

Referring now to FIG. 2, a flow chart representing a method for processing the sensor data 102 is shown, in accordance with an embodiment of the present disclosure. Specifically, a skin tone detection operation is performed at 202 to identify skin tone areas in the sensor data 102. At 204, at least one image enhancement process is selectively modifying for the identified skin tone areas. At 206, the at least one modified image enhancement process is applied to the identified skin tone areas.

Figure 3:
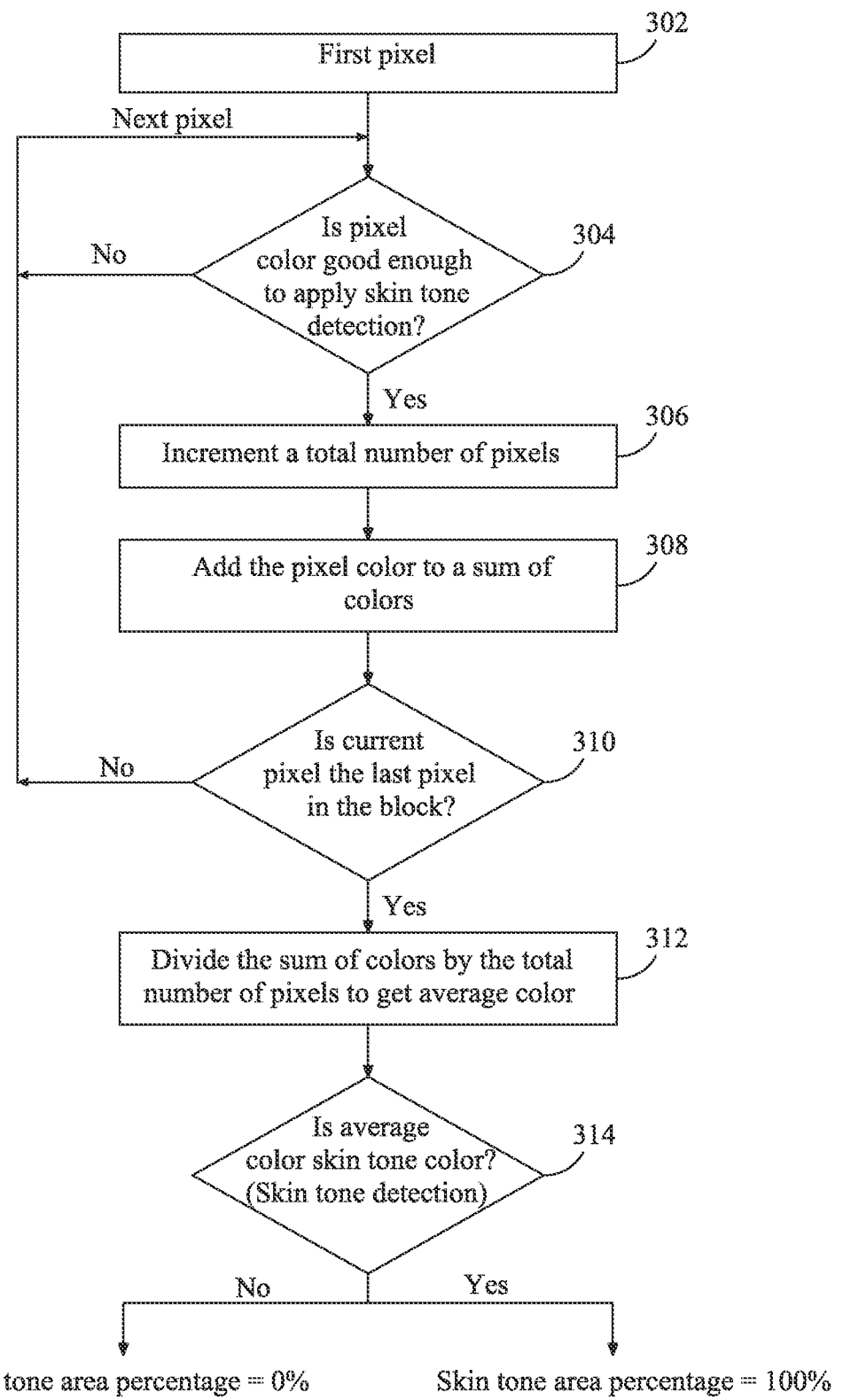
FIG. 3 is a flow chart representing a method for detecting a skin tone in the sensor data, in accordance with an embodiment of the present disclosure.

Referring now to FIG. 3, a flow chart representing a method for detecting a skin tone in the sensor data 102 is shown, in accordance with an embodiment of the present disclosure. Specifically, a first pixel may be received by a filter at 302. At 304, it is determined by the filter whether a pixel color is good enough to apply skin tone detection. This method examines all the pixels in a block of pixels in the sensor data 102 and filters out those pixels whose color is not good enough to apply skin tone detection. For the pixels whose color is good enough to apply the skin tone detection, a total number of pixels is incremented at 306. Otherwise, a next pixel is filtered at 304. Further, at 308 the pixel color is added to the sum of colors. At 310, it is determined whether the current pixel is the last pixel in the pixel block. If yes, then all pixels in the pixel block are processed and the sum of colors is divided by the total number of pixels to get the average color of the pixel block at 312. Otherwise, a next pixel is filtered at 804. At 314, it is determined whether the average color of the pixel block is a skin tone color using the techniques explained above. If yes, then the skin tone area percentage is assigned 100% else the skin tone area percentage is assigned 0%.

Figure 4:
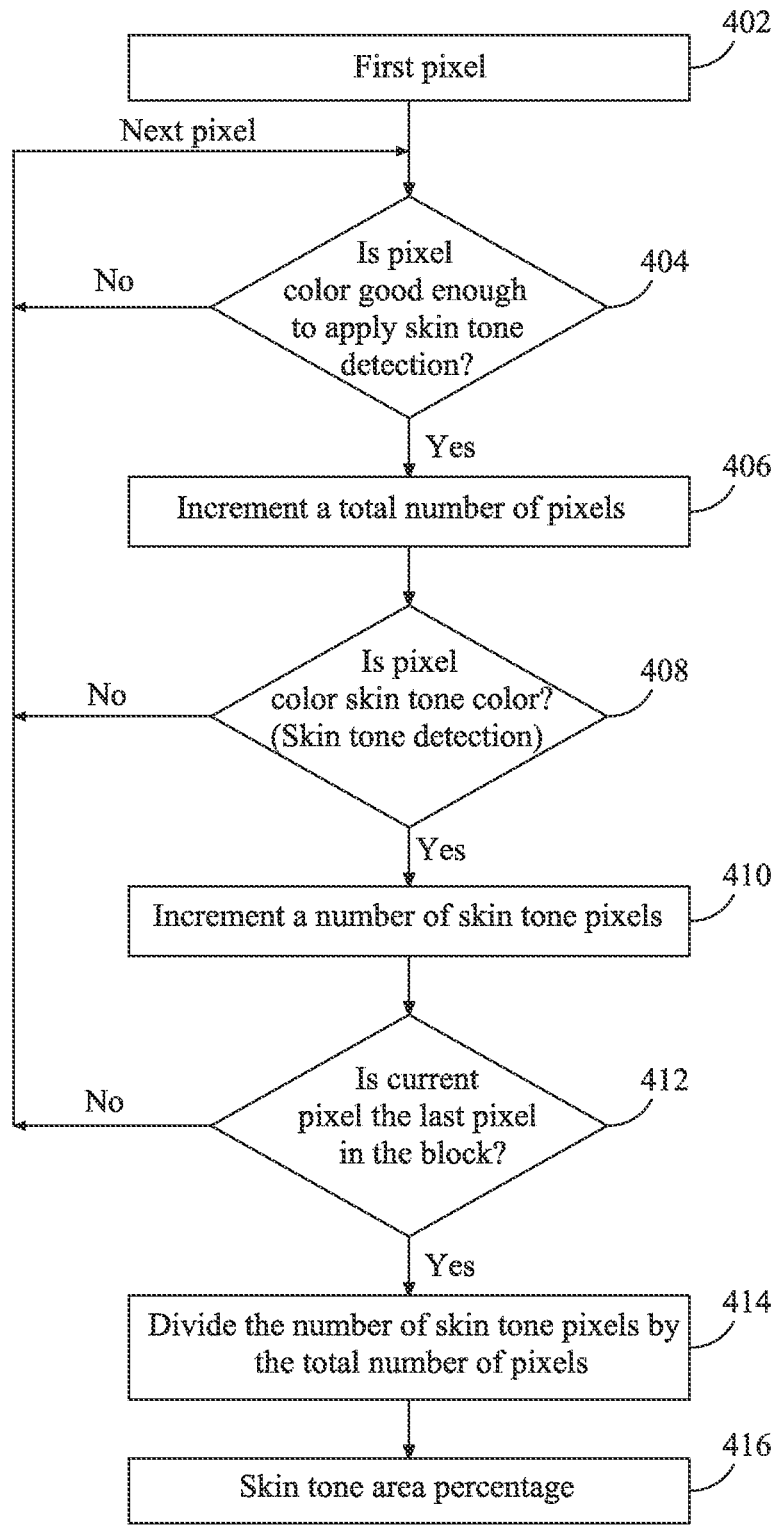
FIG. 4 is a flow chart representing a method for calculating a percentage of the skin tone area in the sensor data, in accordance with an embodiment of the present disclosure.

Referring now to FIG. 4, a flow chart representing a method for calculating a percentage of the skin tone area in the sensor data 102 is shown, in accordance with an embodiment of the present disclosure. Specifically, a first pixel may be received by a filter at 402. At 404, it is determined by the filter whether a pixel color is good enough to apply skin tone detection. This method examines all the pixels in a block of pixels in the sensor data 102 and filters out those pixels whose color is not good enough to apply skin tone detection. For the pixels whose color is good enough to apply the skin tone detection, a total number of pixels is incremented at 406. Otherwise, a next pixel is filtered at 404. At 408, it is determined whether the color of the pixel is a skin tone color using the techniques explained above. If the color of the pixel is determined to be a skin tone color, a number of skin tone pixels are incremented at 410. Otherwise, a next pixel is filtered at 404. At 412, it is determined whether the current pixel is the last pixel in the pixel block. If yes, then the number of skin tone pixels is multiplied by 100 and divided by the total number of pixels at 414 to get the skin tone area percentage at 416. Otherwise, a next pixel is filtered at 404.

It will be appreciated that embodiments of the disclosure described herein may comprise one or more conventional processors and unique stored program instructions that control the one or more processors to implement, in conjunction with certain non-processor circuits, some, most, or all functions of processing a sensor data. Alternatively, some or all functions of processing a sensor data could be implemented by a state machine that has not stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will be understood by those familiar with the art, the disclosure may be embodied in other specific forms without departing from the spirit or essential characteristics thereof. Likewise, the particular naming and division of the modules, agents, managers, functions, procedures, actions, methods, classes, objects, layers, features, attributes, methodologies and other aspects are not mandatory or significant, and the mechanisms that implement the disclosure or its features may have different names, divisions and/or formats. Furthermore, as will be apparent to one of ordinary skill in the relevant art, the modules, agents, managers, functions, procedures, actions, methods, classes, objects, layers, features, attributes, methodologies and other aspects of the disclosure can be implemented as software, hardware, firmware or any combination of the three. Of course, wherever a component of the present disclosure is implemented as software, the component can be implemented as a script, as a standalone program, as part of a larger program, as a plurality of separate scripts or programs, as a statically or dynamically linked library, as a kernel loadable module, as a device driver, and/or in every and any other way known now or in the future to those of skill in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the disclosure, which is set forth in the following claims.

I claim:

1. A method for processing sensor data in an image processor that implements at least one image enhancement process, the method comprising:
    receiving sensor data from an image sensor;
    performing a skin tone detection operation to identify skin tone areas in the sensor data in pre-capture processing;
    selectively modifying at least one image enhancement process for the identified skin tone areas prior to image capture;
    applying the at least one modified image enhancement process to the identified skin tone areas in the sensor data to generate modified sensor data;

feeding the modified sensor data back to the image sensor, thereby enabling the image sensor to capture an image using the modified sensor data; wherein each step is performed in the image processor;

dividing the sensor data into blocks of pixels and calculating a percentage of the skin tone area within each block of pixels; and determining a weighting scheme, wherein the weighting scheme assigns weights to the at least one image enhancement process based on the percentage of the skin tone area within each block of pixels, and wherein the at least one image enhancement process is modified based on the weights assigned.

2. The method of claim 1, wherein the image enhancement process is selected from a group consisting of Auto Focus, Auto Exposure, and Auto White Balance.

3. The method of claim 1, wherein performing the skin tone detection operation comprising classifying the sensor data as one of a skin tone data and a non skin tone data.

4. The method of claim 3, wherein classifying the sensor data comprising classifying a pixel in the sensor data as a skin tone pixel if the pixel's chrominance components U and V in a YUV colorspace satisfy each of the following conditions:

$$90 <= U \text{ component} <= 125;$$

$$133 <= V \text{ component} <= 171; \text{ and}$$

$$270 <= V \text{ component} + 1.1875\ U \text{ component} <= 291.$$

5. The method of claim 3, wherein classifying the sensor data comprising:

dividing the sensor data into blocks of pixels;
calculating an average color for each block of pixels; and
classifying each block of pixels as one of a skin tone pixel block and a non skin tone pixel block, the skin tone pixel block is one for which chrominance components U and V in a YUV colorspace satisfy each of the following conditions:

$$90 <= U \text{ component} <= 125;$$

$$133 <= V \text{ component} <= 171; \text{ and}$$

$$270\ V \text{ component} + 1.1875\ U \text{ component} <= 291.$$

6. The method of claim 1, further comprising performing post-capture processing on the image captured by the image sensor using the modified sensor data, to thereby generate a processed image as the output of the image processor.

7. An image processor for processing sensor data, the image processor implements at least one image enhancement process, the image processor comprises:

a skin tone detector capable of receiving sensor data from an image processor and performing a skin tone detection operation to identify skin tone areas in the sensor data in pre-capture processing; dividing the sensor data into blocks of pixels and calculating a percentage of the skin tone area within each block of pixels; and determining a weighting scheme, wherein the weighting scheme assigns weights to the at least one image enhancement process based on the percentage of the skin tone area within each block of pixels, and wherein the at least one image enhancement process is modified based on the weights assigned;

an image enhancement module capable of selectively modifying at least one image enhancement process for the identified skin tone areas prior to image capture;

control circuitry capable of applying the at least one modified image enhancement process to the identified skin tone areas in the sensor data to generate modified sensor data and to feed the modified sensor data back to the image sensor, thereby enabling the image sensor to capture an image using the modified sensor data; and a post-capture processing module configured to perform post-capture processing on the captured image using the modified sensor data, to thereby generate a processed image as the output of the image processor.

8. The image processor of claim 7, wherein the image enhancement process is selected from a group consisting of Auto Focus, Auto Exposure, and Auto White Balance.

9. The image processor of claim 7, wherein the skin tone detector classifies the sensor data as one of a skin tone data and a non skin tone data.

10. The image processor of claim 9, wherein the skin tone detector classifies a pixel in the sensor data as a skin tone pixel if the pixel's chrominance components U and V in a YUV colorspace satisfy each of the following conditions:

$$90 <= U \text{ component} <= 125;$$

$$133 <= V \text{ component} <= 171; \text{ and}$$

$$270 <= V \text{ component} + 1.1875\ U \text{ component} <= 291.$$

11. The image processor of claim 9, wherein the skin tone detector classifies the sensor data by:

dividing the sensor data into blocks of pixels;
calculating an average color for each block of pixels; and
classifying each block of pixels as one of a skin tone pixel block and a non skin tone pixel block, the skin tone pixel block is one for which chrominance components U and V in a YUV colorspace satisfy each of the following conditions:

$$90 <= U \text{ component} <= 125;$$

$$133 <= V \text{ component} <= 171; \text{ and}$$

$$270 <= V \text{ component} + 1.1875\ U \text{ component} <= 291.$$

12. A non-transitory computer readable medium containing a computer program product for processing a sensor by an image processor, the computer program product comprising:

program code for receiving sensor data from an image sensor and performing a skin tone detection operation to identify skin tone areas in the sensor data in pre-capture processing;

program code for selectively modifying at least one image enhancement process for the identified skin tone areas prior to image capture;

program code for applying the at least one modified image enhancement process to the identified skin tone areas in the sensor data to generate modified sensor data;

program code to feed the modified sensor data back to the image sensor, thereby enabling the image sensor to capture an image using the modified sensor data;

program code for dividing the sensor data into blocks of pixels and calculating a percentage of the skin tone area within each block of pixels; and program code for determining a weighting scheme, wherein the weighting scheme assigns weights to the at least one image enhancement process based on the percentage of the skin tone area within each block of pixels, and wherein the at least one image enhancement process is modified based on the weights assigned.

13. The computer program product of claim 12, wherein the program code for performing the skin tone detection operation comprising program code for classifying the sensor data as one of a skin tone data and a non skin tone data.

14. The computer program product of claim 13, wherein classifying the sensor data comprising program code for classifying a pixel in the sensor data as a skin tone pixel if the pixel's chrominance components U and V in a YUV colorspace satisfy each of the following conditions:

$$90 <= U\ \text{component} <= 125;$$

$$133 <= V\ \text{component} <= 171;\ \text{and}$$

$$270 <= V\ \text{component} + 1.1875\ U\ \text{component} <= 291.$$

15. The computer program product of claim 13, wherein the program code for classifying the sensor data comprising:
   program code for dividing the sensor data into blocks of pixels;
   program code for calculating an average color for each block of pixels; and
   program code for classifying each block of pixels as one of a skin tone pixel block and a non skin tone pixel block, the skin tone pixel block is one for which chrominance components U and V in a YUV colorspace satisfy each of the following conditions:

$$90 <= U\ \text{component} <= 125;$$

$$133 <= V\ \text{component} <= 171;\ \text{and}$$

$$270 <= V\ \text{component} + 1.1875\ U\ \text{component} <= 291.$$

* * * * *